(No Model.)
J. B. DAVIS.
CORN POPPER.
No. 365,586. Patented June 28, 1887.
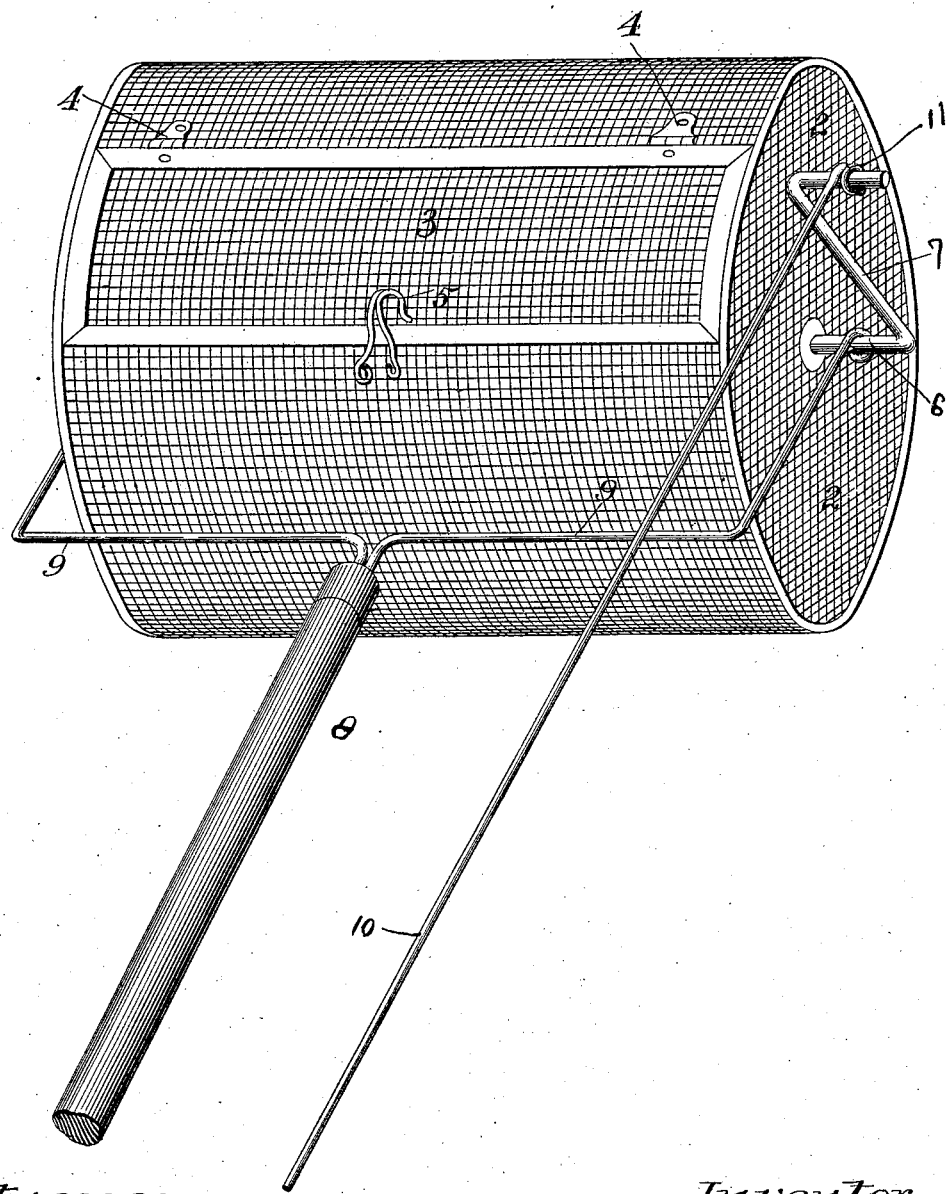
Witnesses:
James Wyatt Oates
Allison Burr Warn
John Tyler Campbell
Inventor.
John Bell Davis
N. PETERS, Photo-Lithographer, Washington, D. C.

UNITED STATES PATENT OFFICE.

JOHN BELL DAVIS, OF SANTA ROSA, CALIFORNIA.

CORN-POPPER.

SPECIFICATION forming part of Letters Patent No. 365,586, dated June 28, 1887.

Application filed April 12, 1886. Serial No. 198,626. (No model.)

*To all whom it may concern:*

Be it known that I, JOHN BELL DAVIS, a citizen of the United States, residing at Santa Rosa, in the county of Sonoma and State of California, have invented certain new and useful Improvements in Corn-Poppers, of which the following is a specification.

My invention relates to corn-poppers; and the object of the invention is to provide a device of this character whereby the corn may be quickly popped and without any liability of its being burned.

The invention consists in the combination, with a wire frame provided with a handle, of a foraminous receptacle journaled in said frame, and having at one end a crank, and an operating-lever connected with said crank-arm.

The invention further consists in the features of construction and combinations of parts hereinafter fully described, and pointed out in the claim.

The single figure of the drawing represents a perspective view of my invention.

Referring to the drawing, 2 represents my improved corn-popper, which consists of a foraminous cylindrical casing or receptacle. This casing or receptacle is preferably of wire-netting, as shown in the present case, to allow free access of heat to the corn. The casing or receptacle 2 is provided with a door, 3, which is secured to the casing by means of hinges 4, and said door is held in a closed position by a catch, 5. Secured to the ends or heads of the casing 2 are trunnions 6, one of which is formed with an integral crank-arm, 7.

8 represents a handle, in which is secured a wire frame. This frame consists of two wire arms which extend from the end of the handle at right angles thereto, and are then bent inwardly and formed with loops to receive the trunnions 6, whereby the casing 2 is journaled.

10 represents an operating-link, which is looped or twisted, as at 11, to engage the crank-arm 7. This lever extends from the crank-arm rearwardly, so that it is within easy reach for operation.

The operation of the device as thus described is as follows: The lid 3 is raised and the corn placed in the casing, and the lid lowered and locked in a closed position by means of the catch 5. The receptacle is then held over the fire and the casing oscillated by reciprocating the link 10. By this arrangement the operator is enabled to stand at quite a distance from the stove, and the corn kept constantly agitated, to prevent it from burning, by means of said lever, thus obviating shaking the entire device.

Having fully described my invention, what I claim as new, and desire to secure by Letters Patent, is—

A corn-popper comprising a handle, 8, a wire frame, 9, secured thereto and extending horizontally in opposite directions therefrom, and then extending forwardly, the outer ends of said frame being provided with loops, as described, a foraminous casing having foraminous ends, said ends having trunnions secured thereto, one of which is extended to form a crank-arm, and a link, 10, connected to the crank-arm and adapted to be operated from the outer end of the handle, substantially as set forth.

Santa Rosa, Sonoma county, California, this January 12, 1886.

JOHN BELL DAVIS.

Witnesses:
JOHN TYLER CAMPBELL,
JAMES WYATT OATES.